United States Patent

Houlihan et al.

[15] 3,671,533

[45] June 20, 1972

[54] 2,3,5,6-TETRAHYDROIMIDAZO[2,1-B]THIAZOLES

[72] Inventors: William J. Houlihan; Robert E. Manning, both of Mountain Lakes, N.J.

[73] Assignee: Sandoz-Wander, Inc., Hanover, N.J.

[22] Filed: Jan. 26, 1970

[21] Appl. No.: 5,894

Related U.S. Application Data

[63] Continuation-in-part of Ser. No. 790,449, Jan. 10, 1969, abandoned, which is a continuation-in-part of Ser. No. 748,929, July 31, 1968, abandoned.

[52] U.S. Cl. .........................260/306.7, 260/309.6, 260/590, 424/270

[51] Int. Cl. .......................................................C07d 99/06

[58] Field of Search................................................260/306.7

[56] References Cited

UNITED STATES PATENTS 3,547,939  12/1970  Manning............................260/306.7

Primary Examiner—Alex Mazel
Assistant Examiner—R. J. Gallagher
Attorney—Gerald D. Sharkin, Frederick H. Weinfeldt, Robert S. Honor, Walter F. Jewell and Richard E. Vila

[57] ABSTRACT

Substituted imidazo thiazoles, e.g., 3-(4'-chlorophenyl)-2-ethyl-3-hydroxy-2,3,5,6-tetrahydroimidazo[2,1-b]thiazole are prepared from 2-haloalkylphenones and 2-imidazolinethione and are useful as anorexics and anti-depressants.

10 Claims, No Drawings

2,3,5,6-TETRAHYDROIMIDAZO[2,1-B]THIAZOLES

This application is a continuation-in-part of application, Ser. No. 790,449 filed Jan. 10, 1969 now abandoned, which in turn is a continuation-in-part of application Ser. No. 748,929 filed July 31, 1968, now abandoned.

This invention relates to novel heterocyclic compounds. More specifically it relates to novel 2-alkyl-3-substituted phenyl-5,6-dihydroimidazo thiazoles, acid addition salts thereof, intermediates therefor, and processes for their preparation.

The thiazoles of the present invention may be represented by the formula

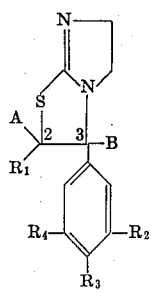
(I)

where each of $R_2$, $R_3$ and $R_4$, independently, represents H or halogen having an atomic weight of about 19 to 36, $R_1$ represents straight chain lower alkyl, i.e., straight chain alkyl having one to four carbon atoms such as methyl, ethyl and propyl, provided at least one of $R_2$, $R_3$ and $R_4$ is other than H, A is H, B is OH or A and B together represent a carbon to carbon bond. Preferred aspects of this invention are those wherein $R_1$ represents methyl or ethyl, $R_3$ represents chloro, $R_2$ and $R_4$ represents H, A is H and B represents OH.

The process for preparing compounds of formula (I) where A and B represent a carbon to carbon bond may be represented as follows:

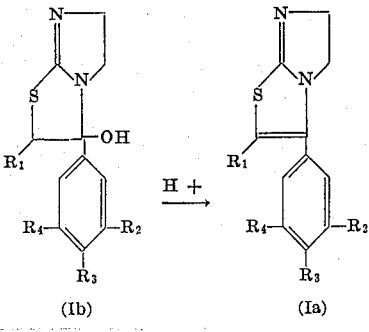

where $R_1$, $R_2$, $R_3$ and $R_4$ have the above stated significance.

The thiazoles of formula (Ia) are prepared from the compounds of formula (Ib) or an acid addition salt thereof by treatment with an acid such as hydrochloric acid, hydrobromic acid or acetic acid (preferably acetic acid) at a temperature from about room temperature to about the reflux temperature of the system, preferably 50° C. to the reflux temperature. The reaction is normally carried out in excess acid, but a solvent may be used and the particular solvent utilized is not considered critical. Solvents which may be used are lower alkanols such as ethanol, isopropanol and the like, acetone, tetrahydrofuran, or similar inert solvents.

When the compounds of formula (Ia) are in the form of acid addition salts, they may be converted to the free base by conventional methods such as suspending the salt form in water and adding sodium carbonate.

The 3-hydroxy imidazo[2,1-b]thiazoles of formula (Ib) may be prepared in acid addition salt form (Ic) in accordance with the following reaction scheme:

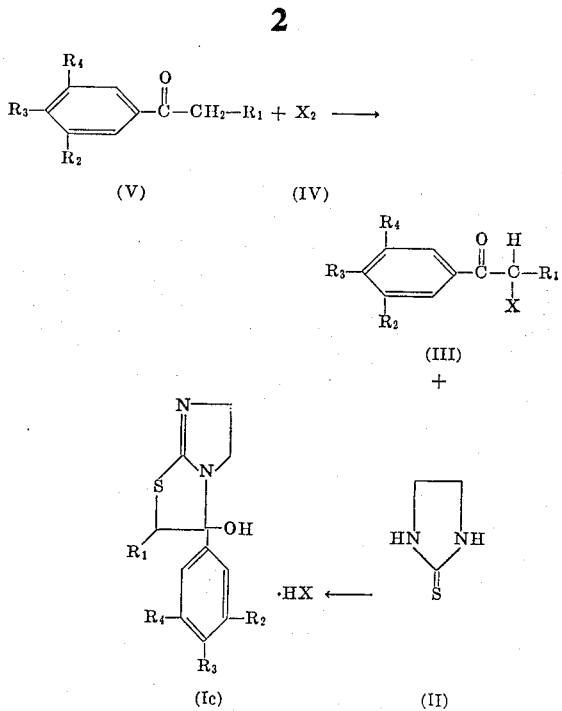

where $R_1$, $R_2$, $R_3$ and $R_4$ have the above stated significance and X is Br or Cl.

The 3-hydroxy imidazo[2,1-b]thiazoles of formula (Ic) are prepared by halogenating an alkyl phenyl ketone (V), e.g., 4'-chlorobutyrophenone, with bromine or chlorine (IV) in an inert solvent such as chloroform, carbon tetrachloride, methylenechloride or the like, at a temperature of 0° - 50° C. (preferably 20° -35° C.) for about 1 to 8 hours. The resulting 2-haloalkylphenone (III) is treated with 2-imidazolinethione (II) in an inert solvent such as acetone or lower alkanols having one to five carbon atoms, e.g., methanol, ethanol or isopropanol, at a temperature of 20°-50° C. (preferably 25°- 35° C.) for about 3 to 48 hours, to give the desired hydroxy compounds. Standard techniques may be used to recover the hydroxy imidazo[2,1-b]thiazoles.

When the salts of formula (Ic) above are recovered and it is desired to convert such salts to the corresponding free bases, conventional techniques may be utilized, e.g., dissolution of the salt in water and precipitation using a base such as sodium hydroxide.

The compounds of formula (Ib) may also be illustrated by their tautomeric equivalents such as represented by the following structural formula

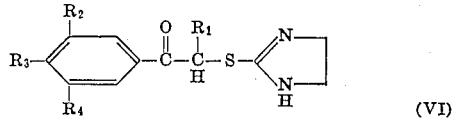
(VI)

where $R_1$, $R_2$, $R_3$ and $R_4$ have the above-stated significance, and it should be appreciated that these tautomers can exist in equilibrium. The predominant tautomer is believed to depend on such factors as whether the compound is a solid or in solution, and the pH and polarity of the environment. In order to simplify this description, however, formula (Ib) only will be used, although both tautomeric forms are considered to be within the concept of the present invention.

It is further recognized that the compounds of formula (Ib) exist as geometric and optical isomers, the separation and recovery of which may be accomplished employing conventional techniques. All of these isomers (geometric and optical) are included within the scope of this invention.

Certain of the compounds of formula (V) are known and are prepared by methods disclosed in the literature. Those not specifically disclosed are prepared from known materials using analogous methods.

The compounds of formula (Ia) and (Ib) are useful because they possess pharmacological activity in animals. More particularly, the compounds possess CNS stimulant activity and are useful as anti-depressants as indicated by their activity in the mouse given parenterally 0.4 – 25.6 mg/kg of body weight of active material. The test method used is basically as described by Spencer, P.S.J., Antagonism of Hypothermia in the Mouse by Anit-depressants, in Anti-depressant Drugs, p. 194 – 204, Eds. S. Garattini and M.N.G. Dukes, Excerpta Medica Foundation, 1967.

The compounds of formulas (Ia) and (Ib) are also useful as anorexics as indicated by their activity in rat given 10 to 50 mg/kg of active material and tested by use of the free feeding method described by Randall, et al. (J.P.E.T., 129, 163, 1960) whereby 16 groups of six male Wistar rats are deprived of food for 18 hours but receive water ad libitum. Consumption of ground food is then measured over a four hour period following oral administration of the active compound.

Additionally, the compounds of formula (Ib) are useful as diuretics as indicated by their activity in unanesthetized rat given 6.25 – 50 mg/kg and tested using basically the method described by R. Aston (Toxicol. and Appl. Pharmacol., 1:277, 1959).

For such uses, the compounds (Ia) or (Ib) may be combined with a pharmaceutically acceptable carrier or adjuvant, and mat be administered orally in such forms as tablets, capsules, elixirs, suspensions and the like, or parenterally in the form of an injectable solution or suspension. The dosage will vary depending upon the mode of administration utilized and the particular compound employed.

These compounds of formulas (Ia) and (Ib) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the maleate, fumarate, tartrate, citrate, succinate, benzoate, acetate, p-toluenesulfonate, benzenesulfonate and the like.

In general, satisfactory results for anorexic or anti-depressant activity are obtained when the compounds are administered at a daily dosage of from about 0.1 to 50 milligrams per kilogram of animal body weight. This daily dosage is preferably given in divided doses, e.g., 2 to 4 times a day, or in sustained release form. For most large animals, the total daily dosage is from about 6 to 300 milligrams and dosage forms suitable for internal administration comprise from about 1.5 to 150 milligrams of the compound in admixture with a solid or liquid pharmaceutical carrier or diluent.

For the diuretic use, the compounds (Ib) may be administered at a daily dosage of from about 1 – 5 milligrams per kilogram of animal body weight, preferably given 2 – 4 times a day or in sustained release form. For most large animals, the total daily dosage is from about 50 – 500 milligrams, and dosage forms suitable for internal administration comprise from about 12.5 – 250 milligrams of compound (Ib) in admixture with a solid or liquid pharmaceutical carrier or diluent.

A representative formulation suitable for oral administration is a tablet prepared by standard tabletting techniques which contains the following:

| Ingredient | Parts by Weight |
| --- | --- |
| 3-(4'-chlorophenyl)-2-ethyl-3-hydroxy-2,3,5,6-tetrahydroimidazo[2,1-b]thiazole | 10 |
| tragacanth | 2 |
| lactose | 79.5 |
| corn starch | 5 |
| talcum | 3 |
| magnesium stearate | 0.5 |

EXAMPLE 1

3-(4'-Chlorophenyl)-2-ethyl-3-hydroxy-2,3,5,6-tetrahydroimidazo[2,1e-b]thiazole hydrobromide

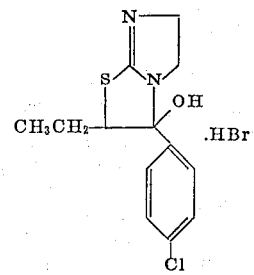

A flask (equipped with a stirrer and dropping funnel) is charged with 54 g (0.30 mole) of 4'-chlorobutyrophenone and 250 ml of chloroform. The solution is stirred and a solution of 48.0 g (16.0 ml, 0.3 mole) of bromine and 250 ml of chloroform is added dropwise at a rate such that the internal flask temperature does not exceed 35° C. The resulting solution is stirred for one hour and the solvent removed in vacuo. The residue is dissolved in 150 ml of isopropanol and added in one portion to a slurry of 30.6 g (0.30 mole) of 2-imidazolinethione and 500 ml of isopropanol. The reaction is exothermic and a solution results. In about 1 hour a solid comes out of solution. Stirring is continued for 24 hours at room temperature at which time the resultant solid is filtered off to give 3(4'-chlorophenyl)-2-ethyl-3-hydroxy-2,3,5,6-tetrahydroimidazo[2,1-b]thiazole hydrobromide; m.p. 280°–283° C.

This compound has been found to have lipolytic activity and may be used to treat obesity or as a weight reducing agent as indicated by its activity in rats given 10 – 37.5 mg/kg of compound and tested as indicated by Dole et al (J. Biol. Chem. 235; 2595, 1960). This compound produces satisfactory results for this use when administered at a daily dosage of from about 0.5 – 37.5 mg/kg of animal body weight. For large animals, dosages of 15 – 150 mg/day are satisfactory and dosage forms may contain about 3.75 – 75 milligrams of the compound in conjunction with pharmaceutical carrier.

EXAMPLE 2

3(4'-Chlorophenyl)-2-ethyl-5,6-dihydroimidazo[2,1-b]thiazole hydrobromide

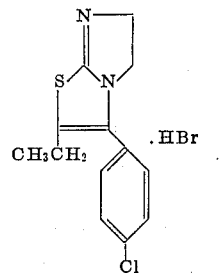

A mixture of 30 g of 3-(4'-chlorophenyl)-2-ethyl-3-hydroxy-2,3,5,6-tetrahydroimidazo[2,1-b]thiazole hydrobromide and 250 ml acetic acid is refluxed for 15 hours. The solvent is then removed in vacuo and the residue is stirred with 100 ml of isopropanol. The solid is filtered off to give 3(4'-chlorophenyl)-2-ethyl-5,6-dihydroimidazo [2,1-b]thiazole hydrobromide; m.p. 281°– 284° C.

EXAMPLE 3

3-(4-Chlorophenyl)-3-hydroxy-2-methyl-2,3,5,6-tetrahydroimidazo[2,1-b]thiazole hydrobromide

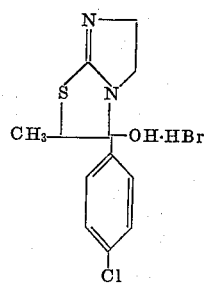

A flask (equipped with a stirrer and dropping funnel) is charged with 54 g (0.30 mole) of 4'-chloropropiophenone and 250 ml of chloroform. The solution is stirred and a solution of 48.0 g (16.0 ml, 0.3 mole) of bromine and 250 ml of chloroform is added (dropwise) at a rate such that the internal flask temperature does not exceed 35° C. The resulting solution is stirred for 1 hour and the solvent removed in vacuo. The resulting solution is stirred for 1 hour and the solvent removed in vacuo. The residue is dissolved in 150 ml of isopropanol and added in one portion to a slurry of 30.6 g (0.30 mole) 2-imidazolinethione and 500 ml of isopropanol. The reaction is exothermic and a solution results. In about 1 hour a solid comes out of solution. Stirring is continued for 24 hours at room temperature at which time the resultant solid is filtered off to give 3-(4'-chlorophenyl)- 3-hydroxy-2-methyl-2,3,5,6-tetrahydroimidazo[2,1-b]thiazole hydrobromide; m.p. 171°–172° C.

This compound also has lipolytic activity and may be used to treat obesity at the same dosage levels as the compound of Example 1.

When the above process is carried out and 4'-fluorobutyrophenone, 3',4'-dichlorobutyrophenone, 3'-chlorobutyrophenone, 4'-chlorovalerophenone, or 4'-chlorohexanophenone is used in place of 4'-chloropropiophenone, there is obtained 2-ethyl-3-(4'-fluorophenyl)-3-hydroxy-2,3,5,6-tetrahydromidazo[2,1]thiazole hydrobromide (m.p. 165°–166° C.), 3-(3'-dichlorophenyl)-2-ethyl-3-hydroxy-2,3,5,6-tetrahydroimidazo[2,1-b]thiazole hydrobromide (m.p. 177°–178° C.), 3-(3'-chlorophenyl)-2-ethyl-3-hydroxy-2,3,5,6-tetrahydroimidazo[2,1-b]thiazole hydrobromide (m.p. 179°–180° C.), 3-(4'-chlorophenyl)-3-hydroxy-2-n-propyl-2,3,5,6-tetrahydroimidazo[2,1-b]thiazole hydrobromide (m.p. 253°–255° C.), or 2-n-butyl-3-(4'-chlorophenyl)-3-hydroxy-2,3,5,6-tetrahydroimidazo[2,1-b]thiazole hydrobromide (m.p. 157°–158° C.), respectively.

EXAMPLE 4

3-(4'-Chlorophenyl)-2-methyl-5,6-dihydroimidazo[2,1-b]thiazole hydrobromide

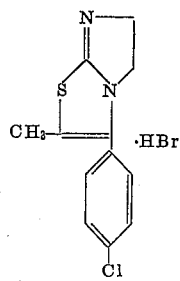

A mixture of 30 g of 3-(4'-chlorophenyl)-3-hydroxy-2-methyl-2,3,5,6-tetrahydroimidazo[2,1-b]thiazole hydrobromide and 250 ml acetic acid is refluxed for 15 hours. The solvent is then removed in vacuo and the residue is stirred with 100 ml of isopropanol. The solid is filtered off to give 3-(4'-chlorophenyl)-2-methyl-5,6-dihydroimidazo[2,1-b]thiazole hydrobromide; m.p. 289°–290° C.

When the above procedure is carried out and each of the products set out in the last paragraph of Example 3 is used in place of 3-(4'-chlorophenyl)-3-hydroxy-2-methyl-2,3,5,6-tetrahydroimidazo[2,1-b]thiazole hydrobromide, there is obtained 2-ethyl-3-(4'-fluorophenyl)-5,6-dihydroimidazo[2,1-b]thiazole hydrobromide (m.p. 262°–263° C.), 3-(3',4'-dichlorophenyl)-2-ethyl-5,6-dihydroimidazo [2,1-b]thiazole hydrobromide (m.p. 255°–257° C.), 3-(3'-chlorophenyl)-2-ethyl-5,6-dihydroimidazo[2,1-b]thiazole hydrobromide (m.p. 239°–241° C.), 3-(4'-chlorophenyl)-2-n-propyl-5,6-dihydroimidazo[2,1-b]thiazole hydrobromide (m.p. 253°–255° C.), or 2-n-butyl-3-(4'-chlorophenyl)-5,6-dihydroimidazo[2,1-b]thiazole hydrobromide (m.p. 195° C.), respectively.

EXAMPLE 5

3-(4'-chlorophenyl)-2-ethyl-3-hydroxy-2,3,5,6-tetrahydroimidazo[2,1e-b]thiazole

A solution of 45 g of 3-(4'-chlorophenyl)-2-ethyl-3-hydroxy-2,3,5,6-tetrahydroimidazo [2,1-b]thiazole hydrobromide in 250 ml of water is added to a stirred and ice cooled solution of 20 g of sodium hydroxide in 250 ml of water. After 1.5 hours stirring the resultant solid is filtered off to give 3-(4'-chlorophenyl)-2-ethyl-3-hydroxy-2,3,5,6-tetrahydroimidazo[2,1e-b]thiazole; m.p. 165°–166° C.

EXAMPLE 6

3-(4'-chlorophenyl)-2-ethyl-3-hydroxy-2,3,5,6-tetrahydroimidazo[2,1e-b]thiazole maleate To a stirred solution of 5.8 g. (0.05 mole) of maleic acid in 100 ml of methanol there is added dropwise in 0.3 hour a solution of 14.1 g (0.05 mole) of 3-(4'-chlorophenyl)-2-ethyl-3-hydroxy-2,3,5,6-tetrahydroimidazo[2,1-b]thiazole in 400 ml of methanol. After stirring one hour the solution is concentrated in vacuo to about one-third of the original volume, treated with 300 ml of diethyl ether and then cooled in an ice bath to obtain 3-(4'-chlorophenyl)-2-ethyl-3-hydroxy-2,3,5,6-tetrahydroimidazo[2,1e-b]thiazole maleate; mp 89°–92° C.

When the above process is carried out and fumaric acid, tartaric acid, hydrochloric acid or citric acid is used in place of maleic acid, the corresponding fumarate (mp 270°–272° C.); tartrate (mp 128°–130° C.), hydrochloride (mp 270°–272° C.) or citrate (mp 146°–147° C.) respectively, is obtained.

What is claimed is:

1. A compound of the formula

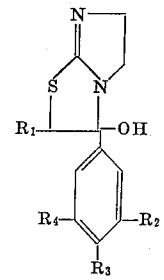

wherein each of $R_2$, $R_3$ and $R_4$, independently, represents H or fluoro or chloro, and $R_1$ represents straight chain lower alkyl, provided at least one of $R_2$, $R_3$ and $R_4$ is other than H, or a pharmacologically acceptable acid addition salt thereof.

2. A compound according to claim 1 of the formula

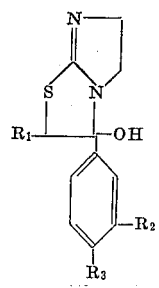

wherein each of $R_2$ and $R_3$, independently, represents H or fluoro or chloro, and $R_1$ represents methyl, ethyl or n-propyl, provided at least one of $R_2$ and $R_3$ is other than H, or a pharmacologically acceptable acid addition salt thereof.

3. A compound according to claim 1 of the formula

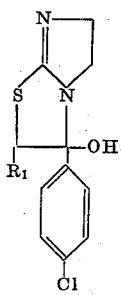

wherein $R_1$ represents methyl or ethyl, or a pharmacologically acceptable acid addition salt thereof.

4. The compound of claim 1 which is 3-(4'-chlorophenyl)-2-ethyl-3-hydroxy-2,3,5,6-tetrahydroimidazo[2,1-b]thiazole.

5. The compound of claim 1 which is 3-(4'-chlorophenyl)-3-hydroxy-2-methyl-2,3,5,6-tetrahydroimidazo[2,1-b]thiazole.

6. The compound of claim 1 which is 2-ethyl-3-(4'-fluorophenyl)-3-hydroxy-2,3,5,6-tetrahydroimidazo[2,1-b]thiazole.

7. The compound of claim 1 which is 3-(3',4'-dichlorophenyl)-2-ethyl-3-hydroxy-2,3,5,6-tetrahydroimidazo[2,1-b]thiazole.

8. The compound of claim 1 which is 3-(3'-chlorophenyl)-2-ethyl-3-hydroxy-2,3,5,6-tetrahydroimidazo[2,1-b]thiazole.

9. The compound of claim 1 which is 3-(4'-chlorophenyl)-3-hydroxy-2-n-propyl-2,3,5,6-tetrahydroimidazo[2,1-b]thiazole.

10. The compound of claim 1 which is 2-n-butyl-3-(4'-chlorophenyl)-3-hydroxy-2,3,5,6-tetrahydroimidazo[2,1-b]thiazole.

* * * * *